United States Patent
Saichi et al.

[11] Patent Number: 5,572,078
[45] Date of Patent: Nov. 5, 1996

[54] SPINDLE MOTOR

[75] Inventors: Masayoshi Saichi; Toru Kumagai, both of Nagano, Japan

[73] Assignee: Sankyo Seiki Mfg. Co., Ltd., Nagano-ken, Japan

[21] Appl. No.: 530,636

[22] Filed: Sep. 20, 1995

[30] Foreign Application Priority Data

Sep. 20, 1994 [JP] Japan ................... 6-251181

[51] Int. Cl.⁶ ........................................ H02K 5/00
[52] U.S. Cl. .................... 310/90; 310/44; 310/67 R; 310/88
[58] Field of Search .............. 310/90, 66, 156, 310/67 R, 88, 44, 45, 89, 208, 259

[56] References Cited

U.S. PATENT DOCUMENTS

| | | | |
|---|---|---|---|
| 5,047,677 | 9/1991 | Mineta | 310/67 R |
| 5,281,886 | 1/1994 | Ohta | 310/90 |
| 5,325,004 | 6/1994 | Mori et al. | 310/67 R |
| 5,402,023 | 3/1995 | Nakanishi et al. | 310/90 |
| 5,483,113 | 1/1996 | Sakuragi et al. | 310/67 R |

FOREIGN PATENT DOCUMENTS

| | | |
|---|---|---|
| 60-230905 | 11/1985 | Japan. |
| 62-167992 | 7/1987 | Japan. |

*Primary Examiner*—Steven L. Stephan
*Assistant Examiner*—Tran Nguyen
*Attorney, Agent, or Firm*—McAulay Fisher Nissen Goldberg & Kiel

[57] ABSTRACT

A motor, such as a spindle motor, and a method for making such motor, wherein the motor has a stationary part, a rotary part mounted on the stationary part rotatably with respect thereto by a bearing and a magnetic fluid seal mechanism interposed in a radial gap between the stationary part and the rotary part is disclosed. The magnetic fluid seal; mechanism comprises a magnetic ring mounted on the stationary part, a ringlike magnet unit mounted on the rotary part and a magnetic fluid held in a gap between the ringlike magnet unit and the magnetic ring. The magnetic ring is made of a sintered metal made by baking a magnetic metal powder. At last the outer peripheral surface of the magnetic ring is preferably treated with a water-repelling treatment which includes impregnation with resin. All of the surfaces of the magnetic ring are non-cut surfaces.

8 Claims, 2 Drawing Sheets

SPINDLE MOTOR

BACKGROUND OF THE INVENTION a) Field of the Invention

This invention relates to a motor, in particular a spindle motor having a magnetic fluid seal mechanism and more particularly to a magnetic ring constituting a part of a magnetic fluid seal mechanism.

b) Description of the Related Art

Among spindle motors for disc drives having a magnetic fluid seal mechanism for blocking leakage of dirty air and oil dust from a ball bearing and the like present in a space inside the spindle motor to an outside space, one such construction is shown in U.S. Pat. No. 5,047,677.

In this disclosure, a magnetic fluid seal mechanism 3 is mounted on the inner peripheral surface of the projecting wall portion of the hub 6. The magnetic fluid seal mechanism 3 is made up of a magnet unit mounted on the inner peripheral surface of the projecting wall portion of the hub 6, a magnetic ring 2 fixed to the outer peripheral surface of the fixed shaft 1a above the inner ring of the ball bearing 4 and made of a magnetic material, and magnetic fluids 3c held in a gap between the outer peripheral surface of the magnetic ring 2 and the magnet unit. The magnet unit is made up of a ringlike magnet 3a, a ringlike pole piece 3b mounted on the inner peripheral surface of the hub 6 and covering the upper and lower end surface of the magnet 3a. The pole pieces 3b project further toward the magnetic ring 2 than the inner peripheral surface of the magnet 3a.

The magnetic ring 2 used in the magnetic fluid seal mechanism 3 is conventionally made by cutting a bar to a predetermined length, cutting a hole in the bar to make a ring, adjusting the internal diameter by passing a reamer through this hole and grinding the inner peripheral surface. However, with this kind of process, not only is the time required to manufacture one magnetic ring long and the machining cost high but also, because a hole is made in the center of a bar, the material of the portion cut away has been wasted. Furthermore, when the magnetic ring 2 has been made by cutting, burrs and the like have been produced on the inner peripheral surface of the magnetic ring 2 and it has been difficult to increase the cylindricality of the magnetic ring 2 and to make it with good accuracy.

OBJECT AND SUMMARY OF THE INVENTION

The present invention was devised in order to solve these kinds of problem with the conventional technology, and an object of the invention is to shorten the manufacturing time required to make one magnetic ring 2 and reduce the cost and provide a spindle motor comprising a magnetic fluid seal mechanism having a magnetic ring 2 on the inner peripheral surface of which no burrs are produced and which has good cylindricality.

DESCRIPTION OF THE PREFERRED EMBODIMENTS

An embodiment of a spindle motor according to the invention will now be described with reference to FIG. 1 and FIG. 2.

Figure 1:
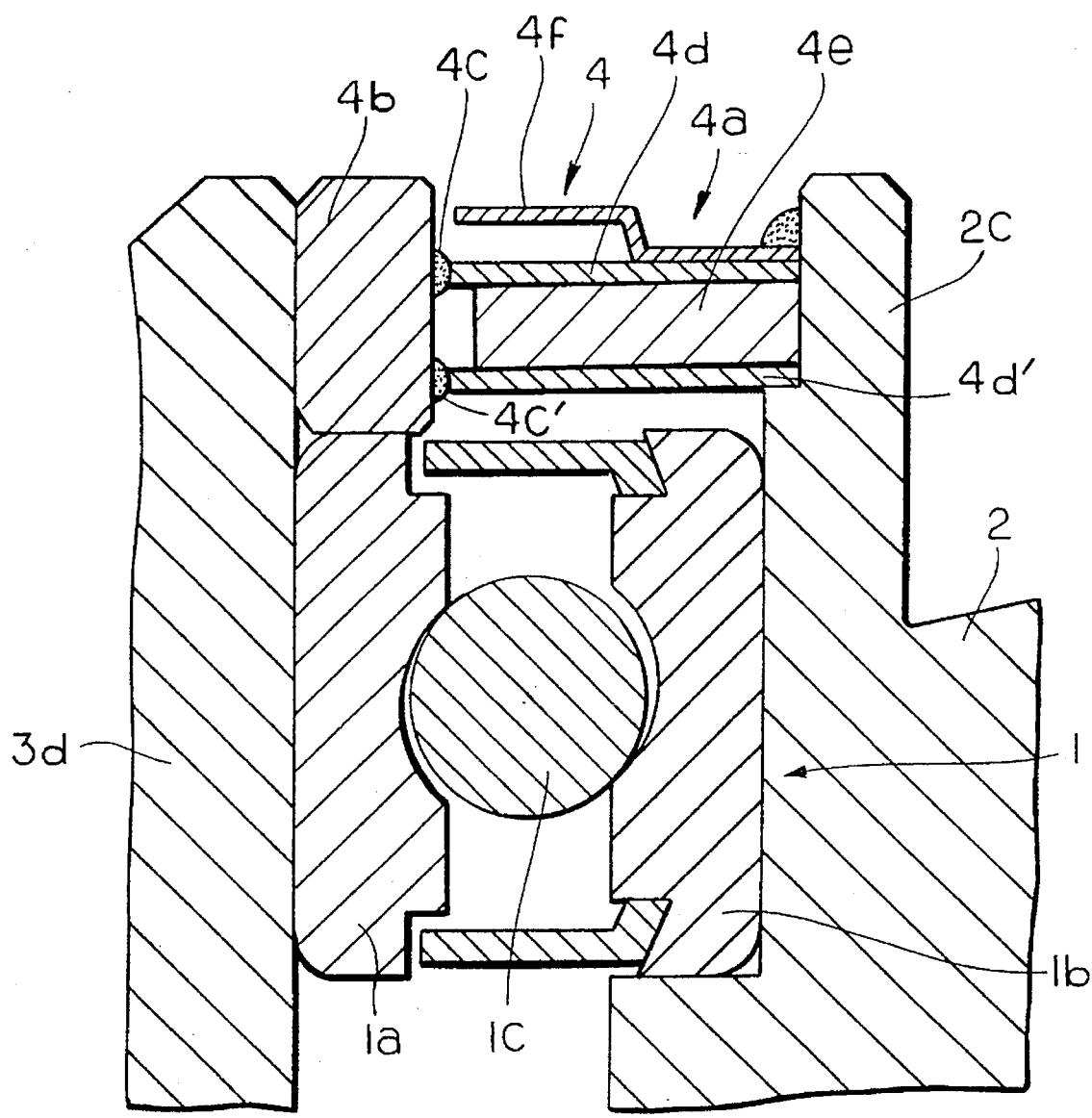
FIG. 1 is a sectional view of an embodiment of a magnetic fluid seal mechanism in a spindle motor according to the invention.
Figure 2:
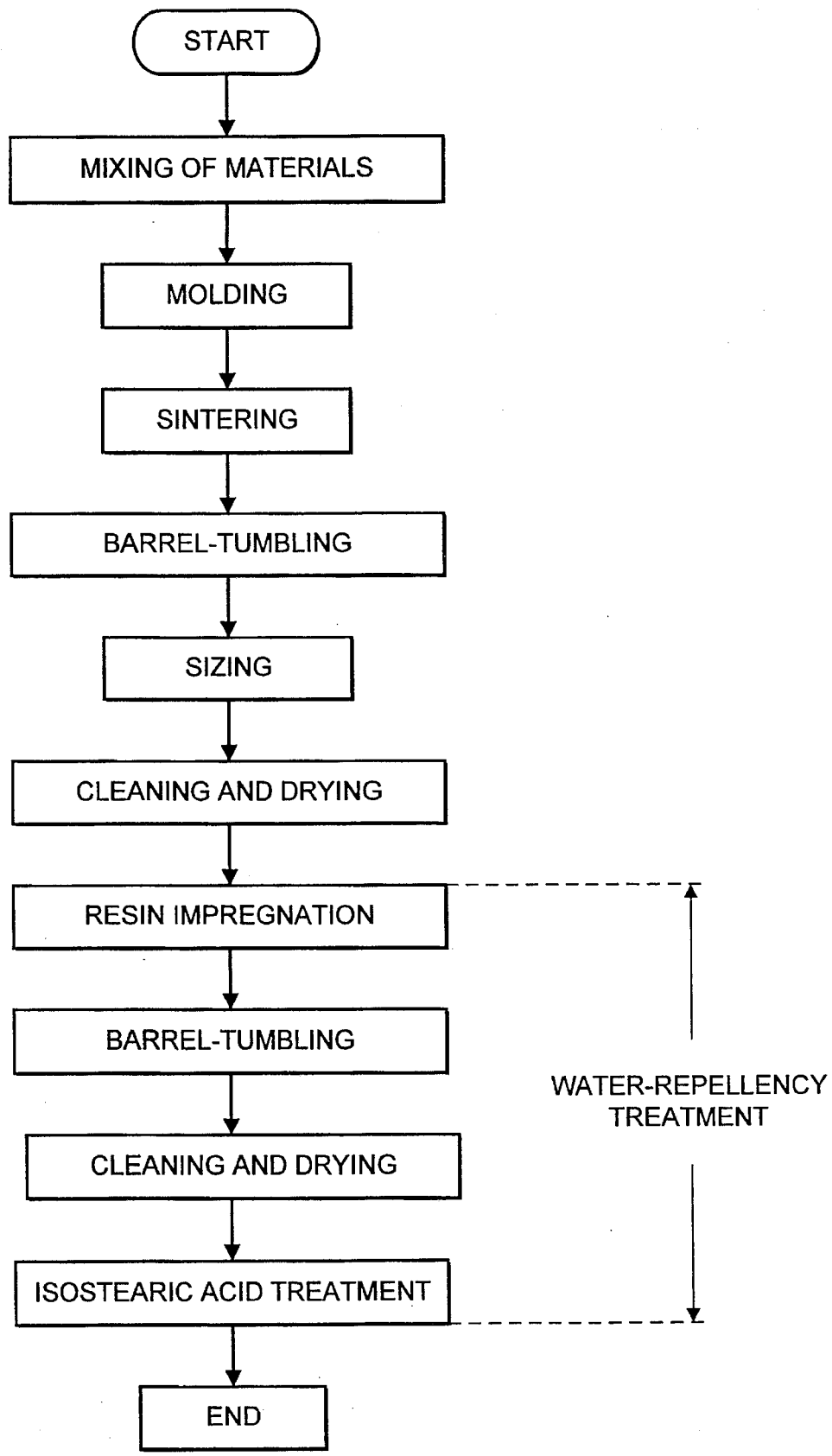
FIG. 2 is a process chart showing a process for manufacturing a magnetic ring used in a magnetic fluid seal mechanism according to the invention.

In FIG. 1, an inner ring 1a of a ball bearing 1 is fitted over the outer periphery of a stationary fixed shaft 3d and an outer ring 1b of the ball bearing 1 is fitted in an inner hole of a rotary hub 2. Balls 1c and lubricating oil not shown in the drawing are interposed between the inner ring 1a and the outer ring 1b, and the hub 2 is rotatable with respect to the fixed shaft 3d. A magnetic fluid seal mechanism 4 is interposed in a radial direction gap between the fixed shaft 3d and the hub 2 above the ball bearing 1.

A magnet unit 4a consisting of a ringlike magnet 4e and ringlike pole pieces 4d, 4d', sandwiching the magnet 4e from both sides is mounted on a cylindrical projecting wall portion 2c of the hub 2. A magnetic ring 4b is mounted on the fixed shaft 3d facing the magnet unit 4a, and magnetic fluids 4c, 4c' are held between the magnetic ring 4b and the pole pieces 4d, 4d'. A cover cap 4f for protecting the magnetic fluid seal mechanism 4 is fixed to the outer side of the magnetic fluid seal mechanism 4.

In the magnetic fluid seal mechanism 4, a magnetic path of the following the route is formed: magnet 4e - pole piece 4d - magnetic fluid 4c - magnetic ring 4b magnetic fluid 4c' - pole piece 4d' - magnet 4e. This magnetic fluid seal mechanism 4 prevents dirty air and oil dust and the like from the ball bearing from leaking out from the fixed shaft side. In FIG. 1 the internal diameter of the magnet 4e is greater than the internal diameter of the pole pieces 4d, 4d', a space is formed between the inner peripheral edge portions of the pole pieces 4d, 4d', and the inner peripheral surface of the magnet 4e, and the magnetic fluids 4c, 4c' are held between the pole pieces 4d, 4d', and the magnetic ring 4b; however, alternatively the pole pieces 4d, 4d', may be dispensed with and a magnetic fluid directly interposed between the magnet 4e and the magnetic ring 4b.

This construction is basically not different from the conventional construction described above, but this embodiment of the invention differs from the conventional example described above in the following respect: That is, the magnetic ring 4b of this invention is characterized in that it consists of a sintered alloy made by baking a magnetic metal powder. This magnetic metal powder for example consists of one or more powders of carbon, silicon, manganese, phosphorus, nickel or chrome as an additive added to iron as its main component, and the magnetic metal powder is made into the magnetic ring 4b by a process which will be further discussed later. The blend of the components of the metal powder is 0.003 wt % carbon, 0.8 wt %, 0.22 wt % manganese, 0.016 wt % phosphorus, 0.005 wt % sulfur, 0.1 wt % nickel and 12.44 wt % chrome, the remainder being iron.

The above-mentioned additives are not all essential, and one or more of the above-mentioned additives or copper, silicon or magnesium or the like added to iron may alternatively be used. All that is necessary is that the magnetic ring 4b be a magnetic body made of a sintered material.

An example of a manufacturing process for obtaining a magnetic ring by sintering a magnetic metal powder consisting of the chemical components mentioned above will be described. Referring to FIG. 2, first the magnetic metal powders are mixed. The mixture is then put into a metal mold and molded into a predetermined shape, and a sintered material is obtained by sintering this in a vacuum. As necessary, the set conditions can be changed and the sintered material sintered further. Then a barrel-tumbling process is carried out to make the surface of the sintered material smooth, the whole sintered material is made dimensionally precise by a sizing process, and a magnetic ring is thereby formed. In the next step the magnetic ring is cleaned using an ultrasonic cleaner or the like and dried.

The magnetic ring 4b consisting of this sintered metal made by baking a magnetic metal powder has countless pores throughout the whole of it. When the magnetic ring 4b has pores, the magnetic fluids 4c, 4c' are sucked into the pores and the amount of the magnetic fluids 4c, 4c' held between the magnetic ring 4b and the pole pieces 4d, 4d' decreases and the magnetic fluids 4c, 4c' sometimes cease to have a sealing action. To avoid this, after the cleaning and drying steps, at least the outer peripheral surface of the magnetic ring 4b is impregnated with a resin such as a fluorine resin or a teflon resin and the pores are thereby blocked up, excess adhered resin is removed by barrel-tumbling and then the surface of the magnetic ring is covered with a covering of isostearic acid by an isostearic acid treatment step. As a result of the surface of the magnetic ring being covered with an isostearic acid covering, the magnetic ring is prevented from corroding. The chain of steps from the resin impregnation step to the isostearic acid processing step is called water-repellency treatment. As a result of this water-repellency treatment, the magnetic fluids 4c, 4c' are prevented from being sucked into the pores in the magnetic ring 4b.

Because the magnetic ring 4b of this invention is manufactured by sintering, absolutely no cutting machining is necessary and naturally the surfaces of the magnetic ring 4b are all non-cut surfaces. As a result, processing steps can be shortened and no burrs are produced.

Because the magnetic ring described above is made by the steps of molding a magnetic metal powder, sintering, sizing and barrel-tumbling, mass-production is easy, the time required to manufacture one magnetic ring can be greatly shortened relative to that when making a magnetic ring conventionally by cutting, productivity can be increased and a cost reduction can also be effected. Also, because magnetic rings of the same dimensions as a mold can be made, there is no difference in dimensional accuracy among a plurality of magnetic rings. Furthermore, the internal diameter cylindricality can also be greatly increased.

The invention has been specifically described above based on an embodiment thereof, but the invention is not limited to this embodiment and various changes can of course be made within the scope of the invention. For example, in the embodiment described above, the pair of ball bearings 1, 1' are used as the bearing, but instead of the ball bearings 1, 1' a dynamic pressure bearing may alternatively be used. Also, although an embodiment of a spindle motor wherein a stationary frame 3 and a fixed shaft 3d are formed integrally was shown, alternatively a hole can be provided in the center of the frame 3 and a separate shaft fixed in this hole.

According to the invention, because the magnetic ring used in the magnetic fluid seal mechanism is made of a sintered metal made by baking a magnetic metal powder, mass production of the magnetic ring is possible, the time required to manufacture one magnetic ring can be made substantially shorter than when a magnetic ring is made conventionally by cutting, productivity can be increased and a cost reduction can be effected. Also, because all the surfaces of the magnetic ring of the invention are non-cut surfaces, there are no burrs on the inner periphery side. Furthermore, if the accuracy of the mold is made high, dimensional dispersion among a plurality of magnetic rings can be eliminated and the internal diameter cylindricality can also be greatly increased.

While the foregoing description and drawings represent the preferred embodiments of the present invention, it will be obvious to those skilled in the art that various changes and modifications may be made therein without departing from the true spirit and scope of the present invention.

What is claimed is:

1. In a motor having a stationary part, a rotary part mounted on the stationary part rotatably with respect thereto by a bearing and a magnetic fluid seal mechanism interposed in a radial gap between the stationary part and the rotary part, the improvement being that:

the magnetic fluid seal mechanism comprises a magnetic ring mounted on the stationary part, a ringlike magnet unit mounted on the rotary part and a magnetic fluid held in a gap between the ringlike magnet unit and the magnetic ring; and the magnetic ring is composed of a sintered metal made by baking a magnetic metal powder.

2. A motor according to claim 1 wherein:

the magnetic metal powder comprises at least one powder selected from the group consisting of carbon, silicon, manganese, phosphorus, nickel or chrome as an additive added to iron as a main component.

3. A motor according to claim 1 wherein:

all surfaces of the magnetic ring are non-cut surfaces.

4. A motor according to claim 1 wherein:

water-repellency treatment is carried out on at least the outer peripheral surface of the magnetic ring so that said surface has a water-repellent characteristic.

5. A motor according to claim 4 wherein:

at least the outer peripheral surface of the magnetic ring is impregnated with resin.

6. A magnetic fluid sealing arrangement for a motor having a stationary part, a rotary part rotatably mounted on a stationary part by a bearing and having a radial gap between the stationary part and the rotary part, said sealing arrangement comprising:

a magnetic ring mounted on the stationary part;

a ring-like magnet unit mounted on the rotary part;

a magnetic fluid retained in a gap between said ring-like magnet unit and said magnetic ring; and wherein said magnetic ring is composed of a sintered metal made by baking a magnetic metal powder.

7. The sealing arrangement of claim 6, wherein the magnetic metal powder comprises at least one powder selected from the group consisting of carbon, silicon, manganese, phosphorous, nickel or chrome as an additive added to iron as a main component.

8. The sealing arrangement of claim 6, wherein all surfaces of the magnetic ring are non-cut surfaces.

* * * * *